May 12, 1942.    J. H. HALSTEAD    2,282,312
PACKING
Filed June 24, 1940    2 Sheets-Sheet 1
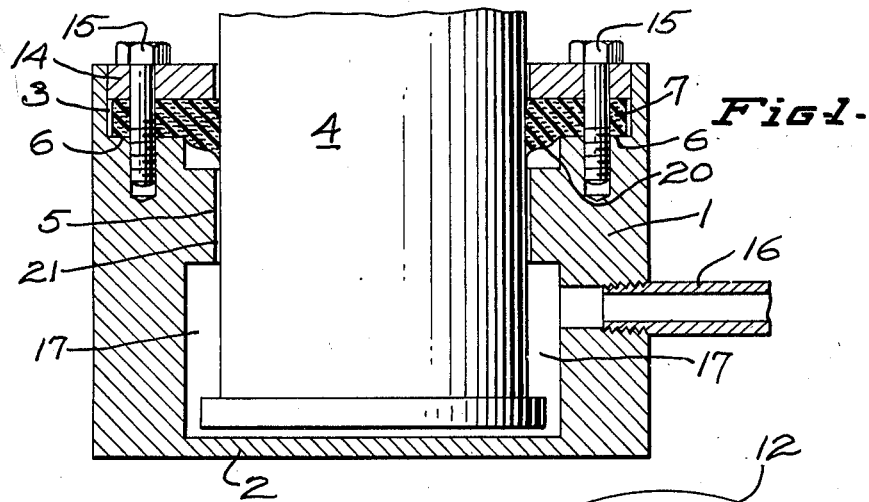
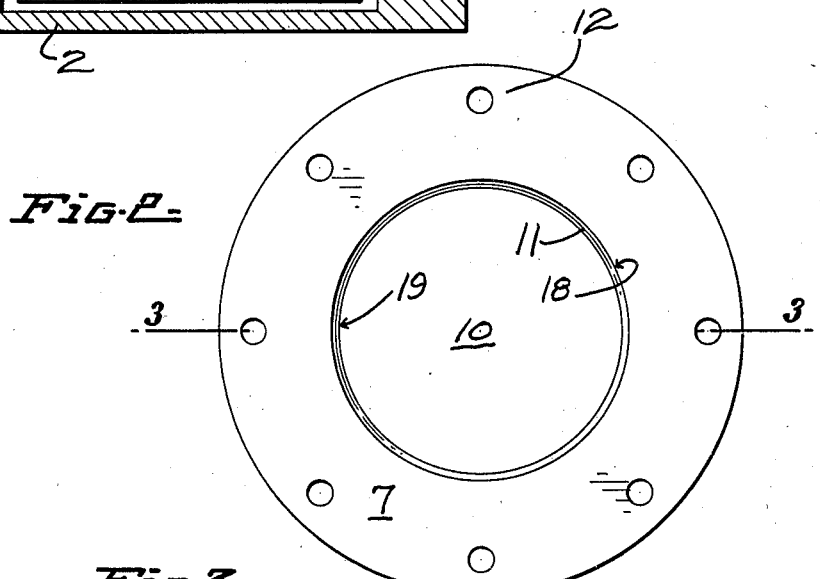
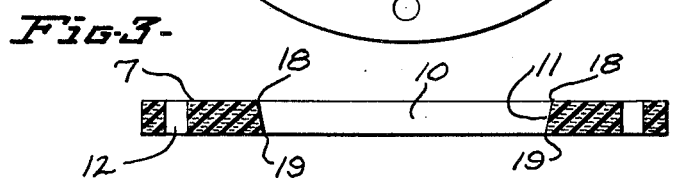
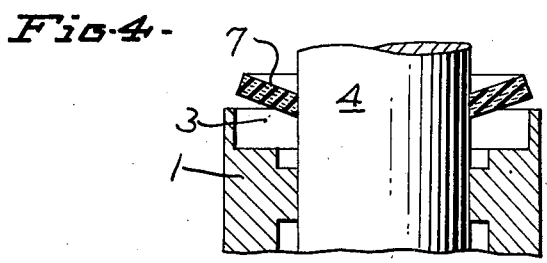
INVENTOR.
JOHN H. HALSTEAD
BY Lippincott & Metcalf
ATTORNEYS.

May 12, 1942. J. H. HALSTEAD 2,282,312
PACKING
Filed June 24, 1940 2 Sheets-Sheet 2
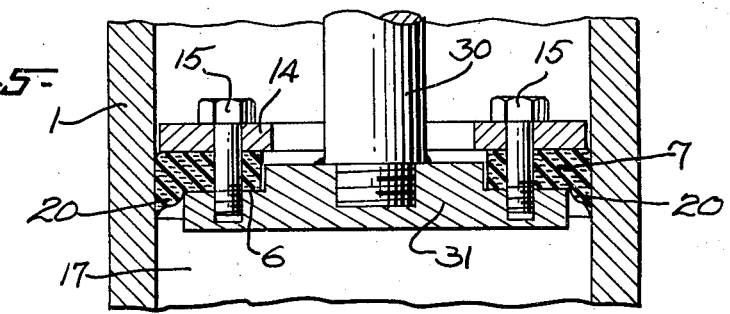
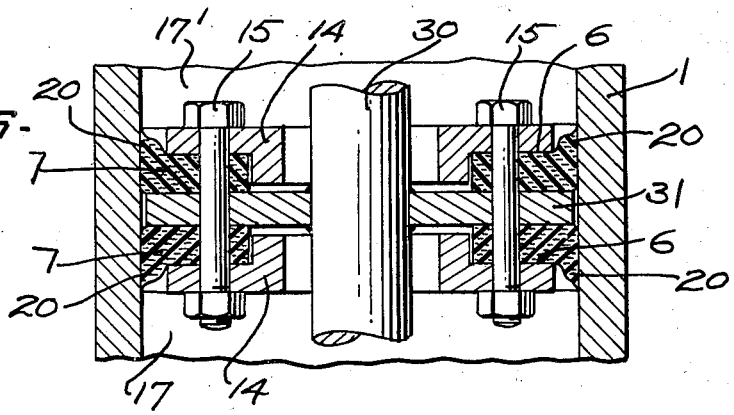
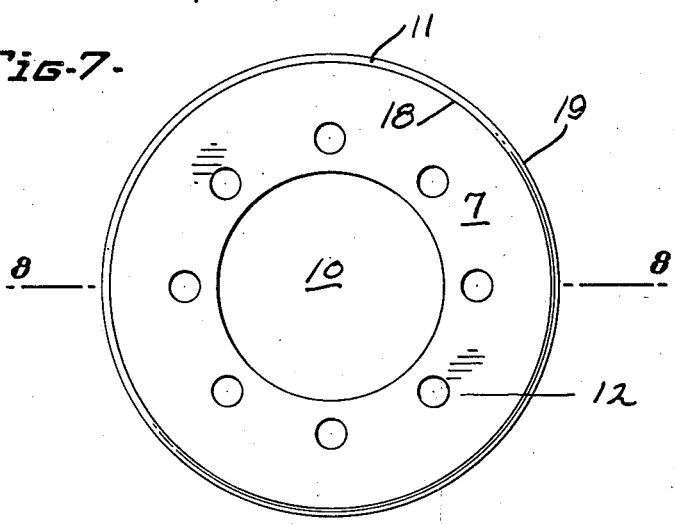
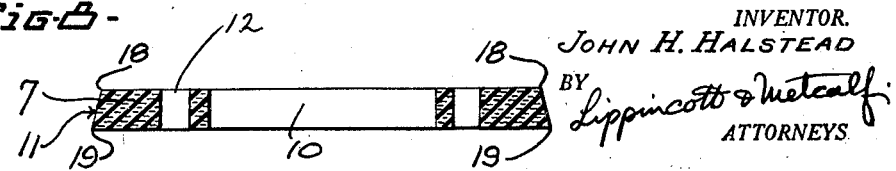
INVENTOR.
JOHN H. HALSTEAD
BY Lippincott & Metcalf
ATTORNEYS Patented May 12, 1942

2,282,312

UNITED STATES PATENT OFFICE 2,282,312

PACKING

John H. Halstead, San Jose, Calif.

Application June 24, 1940, Serial No. 342,106

2 Claims. (Cl. 286—26)

My invention relates to packing, and more particularly to packing ring to be used between relatively moving concentric cylindrical parts, such as, for example, pistons operating in cylinders.

Among the objects of my invention are: To provide a packing having a wide bearing surface on a moving part; to provide a packing operating under compression; to provide a means and method of packing a piston with the material under pressure varying throughout the packing contact; to provide a simple and efficient packing annulus; and to provide a packing annulus wherein pressure is automatically maintained against a moving part on the pressure side of the packing.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

In the drawings:

Fig. 1 is a view, partly in section and partly in elevation, of my invention as applied to a hydraulic device, such as a hydraulic ram or lift.

Fig. 2 is a plan view of a packing annulus used in Fig. 1.

Fig. 3 is a cross sectional view taken as indicated by the line 3—3 in Fig. 2.

Fig. 4 is the diagram showing how the packing annulus is applied to the piston of Fig. 1.

Fig. 5 is a cross sectional view of a packing annulus having a peripheral bearing surface.

Fig. 6 is a cross sectional view of a piston utilizing double packing for a double action piston seal.

Fig. 7 is a plan view of the packing annulus utilized in Figs. 6 and 7.

Fig. 8 is a cross sectional view of the packing annulus taken as indicated by the line 8—8 in Fig. 7.

Referring directly to the figures for a more detailed description of my invention and the advantages thereof, and first to Fig. 1, which illustrates a hydraulic ram or lift, a cylinder 1, which may be stationary, is provided with a closed bottom 2 and an open top 3. Positioned within cylinder 1 is lift piston 4, which may be hollow or solid as desired. Near the top of cylinder 1 is positioned a guide bearing 5, and immediately above the guide bearing 5 is a shoulder 6, on which a packing annulus 7 is positioned. This packing annulus is shown in plan view in Fig. 2 and in cross section in Fig. 3.

The packing annulus 7 is preferably formed of multiple layers of fabric impregnated with rubber or the like, the fabric planes extending parallel to the planar surfaces of the annulus. The packing annulus used in the device of Fig. 1 has an interior aperture 10, the edges of this aperture being provided with a beveled surface 11. The annulus 7 is also provided with bolt apertures 12 so that the outer portion of the annulus may be bolted firmly against shoulder 6 by the use of an annular retaining plate 14 and bolts 15 passing through apertures 12.

The fluid for raising piston 4 may be supplied by an inlet pipe 16 into communication with cylinder space 17, as is well known in the art.

The interior bevel 11 has a dimensional relationship with piston 4 in that the greatest diameter 18 of aperture 10 is a diameter registering closely with the diameter of cylinder 4, whereas the lesser diameter 19 of the aperture 10 is smaller than the piston 4. However, the packing annulus 7 may be easily applied to cylinder 4 by coning the annulus, as shown in Fig. 4, so that the bevel edge 11 exactly fits the circumference of piston 4 on both diameters. In this position, the packing annulus is easily forced over the cylindrical surface of piston 4 until the advancing surface of the annulus contacts shoulder 6. Retaining plate 14 is then placed over the packing annulus and the packing annulus is then flattened by pressure applied by bolts 15. Thus, the smaller diameter 19 of the packing annulus aperture becomes compressed and forms protuberant shoulder 20 around the piston 4, this shoulder extending in the direction of the cylinder pressure. The outer edge of the aperture 10 is under practically no pressure against the cylinder, and the pressure gradually increases toward the inner surface of the packing annulus, the inner edge of the annulus providing the tightest seal.

It should also be noticed that I may provide a small space 21 between bearing 5 and piston 4 so that cylinder pressure may reach the shoulder 20 to force the material thereof against the cylinder. Thus, there are two pressures operating on the sealing edge of aperture 10, namely, that of the pressure of the distorted packing ring material, and the fluid pressure operating against the protuberant shoulder 20.

It will be seen, therefore, that I have provided a simple, single packing element with a beveled surface which forms a fluid-tight seal between the cylinder and the piston, and which can be readily and inexpensively manufactured. Furthermore, due to the fact that the packing annulus can be coned to make both diameters of the bevel fit the cylinder at the time of application, the packing is easily applied to a cylindrical member.

In Figs. 5, 6, 7, and 8, I have shown the packing annulus of my invention provided with bevel 11 on the exterior of the annulus. In Fig. 5, the cylinder 1 is provided with an interior piston rod 30, this piston rod being threaded and welded to a piston head 31. Piston head 31 is provided with a shoulder 6 against which the packing annulus is clamped by the use of annular retaining plate 14, by means of bolts 15.

In this case, the annulus is applied with the beveled surface fitting the interior surface of cylinder 1 and is again coned so that it may easily fit the cylinder surface. The retaining plate 14 is then placed over the coned packing annulus and by means of pressure of bolts 15 forced back to planar shape. This provides an outer protuberant shoulder 20 facing the interior 17 of the cylinder, wherein the pressure exists. Inasmuch as piston head 31 is made of lesser diameter than the interior of cylinder, pressure in the cylindrical space 17 is able to act against protuberant ring 20 to force it against the interior cylinder walls. In this case retaining ring 14 may be used to position the piston centrally.

In Fig. 6, I have shown a double action piston wherein cylinder 1 is provided with a central piston rod 30 and a piston head 31, the only difference being that in this case the pressure is applied to interior cylinder space 17 at one side of the piston head and to the opposite space 17' on the other side of the piston head. I utilize here two packing annuli 7 and two annular plates 14, with bolts 15 that pass through both plates 14, both packing annuli 7, and piston head 31. In this case, I may prefer to provide shoulders 6 on the annular plates 14 rather than on piston head 31, but this is not important. In this case, however, the piston head 31 may extend close to the interior cylinder walls for positioning, whereas the annular plates 14 are spaced away from the cylinder walls to allow the pressure in spaces 17 and 17' to be applied directly against the protuberant shoulders 20 on each packing annulus. In this case, as in the others, each packing annulus is applied to the interior cylinder walls in coned shape and then forced back to generally planar shape by application of the plates 14 under control of bolts 15.

Thus, it will be seen that I have provided a simple packing annulus wherein advantage is gained by the use of a beveled bearing surface which is readily applied to a cylindrical member by coning the annulus, and thereafter bringing the packing annulus back to planar shape, thus distorting the material on the smaller diameter of the bevel, forming a protuberant portion against which the interior pressure of the cylinder may act to better the seal.

It should also be noted that while I prefer to utilize rubber impregnated fabric for the material of the packing annulus, I wish it to be distinctly understood that the term "rubber" includes natural, artificial, or synthetic products having the general characteristics of natural rubber. Some of the synthetic products, for example, have a much greater resistance to oil corrosion than does natural rubber and therefore I do not wish to be limited with respect to the use of natural material. I have found, however, that certain types of rubber which are acted upon by oil, will, when used in contact with oil actually absorb oil, or be otherwise affected by the oil, so that the material swells on the pressure side of the packing. Such swelling of the rubber component of the packing is in some cases an advantage, in that the swelling automatically takes up wear and continues, during service, to provide a tight seal on the pressure side of the annulus.

It should also be noticed that while metal to metal bearing of the pistons in the cylinder does not necessarily need to be an absolute fit, the packing will, being resilient, give in cases where there is a looseness of the pistons with a tendency to side slap, and thus maintain a seal.

While I have described the packing of my invention as being formed from a planar sheet which is forced into a cone at the time of application, I may also desire to initially mold the packing annulus in conical form and thereafter change its shape. Such a packing annulus will have a shape as shown in Fig. 4 on or off the piston. Therefore, when the retaining plates 14 are applied, distortion will occur in exactly the same manner, and giving exactly the same results as the flat modification shown in Fig. 3. Furthermore, it will be noticed that while I have shown shoulder 6 extended relatively close to the bevelled edge, I wish it distinctly understood that the amount of bearing of the shoulder 6 on the surfaces of the annulus may be varied within wide limits. The clamping may in fact, be so near the periphery of the annulus in the device shown in Fig. 3, or similarly, so near the inner edge of aperture 19 in Fig. 7, that the portion of the annulus adjacent the sealing edge 11 may still remain in coned shape.

In other words I may prefer not to completely distort the coned ring into a planar ring. I may utilize the stabilizing clamp at a distance away from the sealing edge in order that varying degrees of distortion may be exerted against the sealing edge subjected to cylinder pressure. Thus, in the embodiment shown in Fig. 4 the clamping may be confined to the extreme periphery of the annulus. This will throw the smaller diameter edge 19 against piston 4 but the central portion of the annulus will still remain conical, and there will be a lesser shoulder 20 than if the conical shape were entirely reduced to a uniform plane. Thus only a part of the annulus need be flattened to form a proper seal.

I claim:

1. Means for packing a relatively movable cylindrical piston member and a cylinder member assembly consisting of a shoulder on one of said members extending closely adjacent and spaced from the bearing surface on the other member, said shoulder having an annular channel therein open to said bearing surface, a single normally planar packing sheet having an aperture therein, said aperture having one edge diameter fitting said bearing surface and the other edge diameter smaller than the diameter of said bearing surface, both of said edges fitting said bearing surface when said packing sheet is temporarily coned with said smaller diameter adjacent said channel with the contiguous surface in contact with the remainder of said shoulder, and an annular retaining ring bolted to said shoulder and in contact with the surface of said sheet contiguous to the larger diameter edge thereof for forcing said coned sheet back to planar shape whereby all of said sheet is planar except a distorted portion adjacent said smaller diameter edge, said distorted portion being free in said channel.

2. Apparatus in accordance with claim 1 wherein said annular retaining ring extends closely adjacent and spaced from said bearing surface and terminates in contact with said sheet adjacent the larger diameter edge of said aperture.

JOHN H. HALSTEAD.